(12) United States Patent
Neff

(10) Patent No.: US 7,389,250 B2
(45) Date of Patent: Jun. 17, 2008

(54) COERCION-FREE VOTING SCHEME

(75) Inventor: C. Andrew Neff, Bellevue, WA (US)

(73) Assignee: Demoxi, Inc., Bellevue, WA (US)

( * ) Notice: Subject to any disclaimer, the term of this patent is extended or adjusted under 35 U.S.C. 154(b) by 0 days.

(21) Appl. No.: 10/367,631

(22) Filed: Feb. 14, 2003

(65) Prior Publication Data

US 2003/0154124 A1 Aug. 14, 2003

Related U.S. Application Data

(63) Continuation-in-part of application No. PCT/US02/09264, filed on Mar. 25, 2002, and a continuation-in-part of application No. 09/816,869, filed on Mar. 24, 2001, now Pat. No. 6,950,948.

(60) Provisional application No. 60/357,210, filed on Feb. 14, 2002, provisional application No. 60/191,785, filed on Mar. 24, 2000, provisional application No. 60/252,376, filed on Nov. 21, 2000, provisional application No. 60/268,551, filed on Feb. 14, 2001, provisional application No. 60/311,680, filed on Aug. 9, 2001, provisional application No. 60/312,671, filed on Aug. 15, 2001, provisional application No. 60/313,003, filed on Aug. 16, 2001.

(51) Int. Cl.
*G06F 11/00* (2006.01)
(52) U.S. Cl. ........................................ 705/12
(58) Field of Classification Search .................. 705/12
See application file for complete search history.

(56) References Cited

U.S. PATENT DOCUMENTS

| 4,774,665 A | 9/1988 | Webb |
| 5,278,753 A | 1/1994 | Graft, III |
| 5,400,248 A | 3/1995 | Chisholm |
| 5,495,532 A | 2/1996 | Kilian et al. |

(Continued)

FOREIGN PATENT DOCUMENTS

| CA | 2176990 | 11/1996 |

(Continued)

OTHER PUBLICATIONS

Cranor et al., Design and Implementation of a Practical Security-Conscious Electronic Polling System, Department of Computer Science, Washington University, St. Louis, Missouri, Jan. 23, 1996 [Google].*

(Continued)

*Primary Examiner*—Susanna M Diaz
(74) *Attorney, Agent, or Firm*—Perkins Coie LLP

(57) ABSTRACT

A facility for conducting a coercion-resistant electronic collection is described. The facility receives from the voter a first voter conformation value. At a later time, the facility receives from the voter an encrypted ballot and a second voter confirmation value. Without regard for the value of the received second voter confirmation value, the facility adds the received ballot to a publicly-available list of cast ballots. After the addition, members of the public are able to verify the addition of the received ballot to the list without being able to determine whether the ballot will be counted. The facility counts the ballot if and only the second voter confirmation value received with the ballot matches the received first voter confirmation value.

6 Claims, 2 Drawing Sheets

U.S. PATENT DOCUMENTS

| | | | |
|---|---|---|---|
| 5,521,980 A | 5/1996 | Brands | |
| 5,610,383 A | 3/1997 | Chumbley | |
| 5,682,430 A | 10/1997 | Kilian et al. | |
| 5,708,714 A | 1/1998 | López et al. | |
| 5,717,759 A | 2/1998 | Micali | |
| 5,864,667 A | 1/1999 | Barkan | |
| 5,875,432 A | 2/1999 | Sehr | |
| 5,878,399 A | 3/1999 | Peralto | |
| 5,970,385 A | 10/1999 | Pykalisto | |
| 6,021,200 A | 2/2000 | Fischer | |
| 6,081,793 A * | 6/2000 | Challener et al. | 705/50 |
| 6,092,051 A * | 7/2000 | Kilian et al. | 705/12 |
| 6,250,548 B1 | 6/2001 | McClure et al. | |
| 6,317,833 B1 | 11/2001 | Jakobsson | |
| 6,317,883 B2 * | 11/2001 | Marics | 725/56 |
| 6,523,115 B1 | 2/2003 | Ono et al. | |
| 6,540,138 B2 | 4/2003 | Hall et al. | |
| 6,550,675 B2 | 4/2003 | Davis et al. | |
| 6,769,613 B2 | 8/2004 | McDermott et al. | |
| 6,845,447 B1 | 1/2005 | Fujioka et al. | |
| 2001/0034640 A1* | 10/2001 | Chaum | 705/12 |
| 2002/0077885 A1 | 6/2002 | Karro et al. | |
| 2002/0077887 A1 | 6/2002 | London Shrader et al. | |
| 2002/0133396 A1 | 9/2002 | Barnhart | |
| 2003/0158775 A1* | 8/2003 | Chaum | 705/12 |

FOREIGN PATENT DOCUMENTS

| | | |
|---|---|---|
| EP | 0 697 776 A2 | 2/1996 |
| EP | 0 743 620 A2 | 11/1996 |
| JP | 08-263575 | 10/1996 |
| JP | 08-315053 | 11/1996 |
| JP | 10-257047 | 9/1998 |
| JP | 10-285157 | 10/1998 |
| WO | WO92/03805 A1 | 3/1992 |
| WO | WO98/14921 | 4/1998 |
| WO | WO01/22200 A2 | 3/2001 |

OTHER PUBLICATIONS

International Preliminary Examination Report, International Application No. PCT/US01/43962, Jun. 3, 2003, 4 pages.

Benaloh, J., "Secret Sharing Homomorphisms: Keeping Shares of a Secret Secret", Advances in Cryptology—Crypto 1986, Lecture Notes in Computer Science, pp. 251-260, Springer-Verlag, Berlin, 1987.

Benaloh, J., et al., "Distributing the Power of a Government to Enhance the Privacy of Voters", ACM Symposium on Principles of Distributed Computing, pp. 52-62, 1986.

Borrell, Joan et al., "An implementable secure voting scheme", *Computers & Security*, Elsevier Science, Ltd., Great Britian, 1996, vol. 15, No. 4, pp. 327-338.

Chaum, D, "Elections with Unconditionally-Secret Ballots and Disruption Equivalent to Breaking RSA", Eurocrypt 1988, pp. 177-182.

Chaum, D., "Untraceable Electronic Mail, Return Addresses, and Digital Pseudonyms", Communications of the ACM, 24(2):84-88, 1981.

Cramer, R, et al., "A Secure and Optimally Efficient Multi-Authority Election Scheme", Advances in Cryptology—Eurocrypt 1997, Lecture Notes in Computer Science, Springer-Verlag, 1997.

Cramer, R., et al., "Multi-Authority, Secret-Ballot Elections with Linear Work", Advances in Cryptology—Eurocrypt 1996, Lecture Notes in Computer Science, Springer-Verlag, Berlin, 1996.

Cramer, R., et al., Proofs of Partial Knowledge and Simplified Design of Cryptology—Crypto 1994, Lecture Notes in Computer Science, pp. 174-187, Springer-Verlag, Berlin, 1994.

Cranor, L. F., "Electronic Voting, Computerized polls may save money, protect privacy," Crossroads, The ACM's First Electronic Publication, May 6, 1999, 4 pages.

Cranor, Lorrie et al., "Sensus: A Security-Conscious Electronic Polling System for the Internet", Proceedings of the Hawaii International Conference on System Sciences, IEEE 1997, pp. 561-570.

Diffie, W., et al., "New Directions in Cryptography", IEEE Transactions on Information Theory, 22(6):644-654, 1976.

ElGamal, T., "A Public Key Cryptosystem and a Signature Scheme Based on Discrete Logarithms", IEEE Transactions on Information Theory, IT-31(4):469-472, 1985.

Fiat, A., et al., "How to Prove Yourself: Practical Solutions to Identification and Signature Problems", Advances in Cryptology—Crypto 1986, Lecture Notes in Computer Science, pp. 186-194, Springer-Verlag, New York, 1987.

Fujioka, A., et al., "A Practical Secret Voting Scheme for Large Scale Elections", Advances in Cryptology—Auscrypt 1992, Lecture Notes in Computer Science, pp. 244-251, Springer-Verlag, 1992.

Gennaro, R., "Achieving independence efficiently and securely", Proceedings 14$^{th}$ ACM Symposium on Principles of Distributed Computing (PODC 1995), New York, 1995.

Herschberg, M. A., "Secure Electronic Voting Over the World Wide Web," Massachusetts Institute of Technology, May 27, 1997, 81 pages.

Iversen, K., "A Cryptographic Scheme for Computerized General Elections", Crypto 1991, pp. 405-419.

Jan, Jin-Ke et al., "A Secure Electronic Voting Protocol with IC Cards", Elsevier Science Inc., New York, J. Systems Software 1997, 39:93-101.

Mu, Yi et al., "Anonymous Secure E-Voting over a Network", Proceedings, Annual Computer Security Applications Conference, IEEE 1998, pp. 293-299.

Odlyzko, A. M., "Discrete logarithms in finite fields and their cryptographic significance", Advances in Cryptology—Eurocrypt 1984, Notes in Computer Science, Springer-Verlag, 1984.

Park, C., et al., "Efficient Anonymous Channel and All/Nothing Election Scheme", Advances in Cryptology—Eurocrypt 1993, Lecture Notes in Computer Science, pp. 248-259, Springer-Verlag, 1993.

Pedersen, T., "A Threshold Cryptosystem without a Trusted Party", Advances in Cryptology—Eurocrypt 1991, Lecture Notes in Computer Science, pp. 522-526, Springer-Verlag, 1991.

Sako, K., et al, "Receipt-Free Mix-Type Voting Scheme—A practical solution to the implementation of a voting booth", Eurocrypt 1995, pp. 393-403.

Sako, K., et al., "Secure Voting Using Partially Compatible Homomorphisms", Advances in Cryptology—Crypto 1994, Lecture Notes in Computer Science, Springer-Verlag, 1994.

Schnorr, C.P., "Efficient Signature Generation by Smart Cards", Journal of Cryptology, 4(3):161-174, 1991.

Schoenmakers, B., "A Simple Publicly Verifiable Secret Sharing Scheme and its Application to Electronic Voting", Advances in Cryptology—Crypto 1999, Lecture Notes in Computer Science, pp. 1-17, Springer-Verlag 1999.

Shamir, A., "How to Share a Secret", Communications of the ACM, 22(11):612-613, 1979.

Schneier, Bruce, "Applied Cryptography, Second Edition," John Wiley & Sons, Inc., 1996, pp. 476-481, 490-491, and 532-533.

Davies, D. W., et al., "Security for Computer Networks," John Wiley & Sons, Ltd., Great Britain, 1984, pp. 253-257.

Benaloh, J. et al., "Receipt-Free Secret-Ballot Elections," Proceedings of 26th ACM Symposium on Theory of computing, Montreal, May 1994, pp. 544-553.

Chaum, D., "Secret-Ballot Receipts: True Voter-Verifiable Elections," IEEE Computer Society, IEEE Security & Privacy, Jan.-Feb. 2004, vol. 2, No. 1, pp. 38-47.

Chaum, D., et al., "Wallet Databases with Observers," Crypto, 1992, vol. 740, Lecture Notes in Computer Science, pp. 89-105.

Cramer, R, et al., "A Secure and Optimally Efficient Multi-Authority Election Scheme", European Transactions on Telecommunications, Sep.-Oct. 1997, pp. 481-490, 8(5), EUREL Publication, 1997.

Koblitz, N., "Public Key," Chapter IV, A Course in Number Theory and Cryptograph, 2$^{nd}$ Edition, pp. 83-124, Springer-Verlag, 1994.

Naor, M., et al., "Visual Cryptograph," Eurocrypt 94, LNCS, Springer-Verlag, Berlin, 1995, vol. 950, pp. 1-12.

Neff, C.A., "A Verifiable Secret Shuffles and its Application to E-Voting," Eighth ACM Conference on Computer and Communications Security (CCS-8), Nov. 2001, pp. 116-125.

Liu, Shengli et al., "A Voting Protocol Based on Elliptic Curve Cryptosystems," Journal of Electronics, Jan. 2000, pp. 84-89, vol. 22, No. 1 (English translation attached.).

Abe, M., "Universally Verifiable Mix-net with Verification Work Independent of the Number of Mix-servers," Advances in Cryptology—Eurocrypt '98: International Conference on the Theory and Application of Cryptographic Techniques, pp. 437-447, vol. 1403, May/Jun. 1998 Proceedings, Finland, Springer-Verlag GmbH, Germany.

Jakobsson, M. "A Practical Mix," Advances in Cryptology—Eurocrypt '98: International Conference on the Theory and Application of Cryptographic Techniques, pp. 448-461, vol. 1403, May/Jun. 1998, Finland, Springer-Verlag GmbH, Germany.

Jakobsson, M. "Flash Mixing," Proceedings of the Eighteenth Annual ACM Symposium on Principles of Distributed Computing, Atlanta, Georgia, 1999, pp. 83-89, ACM Press, New York, NY, USA.

Jakobsson, M. et al., "Making Mix Nets Robust For Electronic Voting By Randomized Partial Checking," USENIX 2002, 2002, pp. 1-15.

Jules, Ari et al., "Coercion-Resistant Electronic Elections (Extended Abstract)," *WPES '05*, Nov. 7, 2005, Alexandria, VA, 10 pages.

Jules, Ari et al., "Coercion-Resistant Electronic Elections," RSA Laboratories, Bedford, MA, 2005, 21 pages.

* cited by examiner

US 7,389,250 B2

COERCION-FREE VOTING SCHEME

CROSS-REFERENCE TO RELATED APPLICATIONS

This application claims the benefit of U.S. Provisional Application No. 60/357,210 filed Feb. 14, 2002; and this application is a continuation-in-part of U.S. patent application Ser. No. 09/816,869, filed Mar. 24, 2001 now U.S. Pat. No. 6,950,948, which claims the benefit of U.S. Provisional Application Nos. 60/191,785 filed Mar. 24, 2000, 60/252,376 filed Nov. 21, 2000, and 60/268,551 filed Feb. 14, 2001; and this application is a continuation-in-part of International Application No. PCT/US02/09264 filed Mar. 25, 2002, which claims priority to U.S. patent application Ser. No. 09/816,869 filed Mar. 24, 2001, and U.S. Provisional Applications Nos. 60/311,680 filed Aug. 9, 2001, and 60/312,671 filed Aug. 15, 2001, and 60/313,003 filed Aug. 16, 2001; all ten of which applications are incorporated herein in their entireties.

TECHNICAL FIELD

This application is directed to the technical field of security measures for electronically-conducted elections.

BACKGROUND

Various electronic and/or digital election protocols exist that provide cryptographic privacy to voters. With many of these election protocols, the voter needs to keep certain types of information secret. An example of such secret information is a voter's private key. These existing election protocols can be problematic, however, if a person threatens, or entices a voter (e.g., financially) to give up the secret information. When this type of coercion occurs, it is possible for the person to either know how the voter voted, or vote on his or her behalf.

Similar problems arise with the use of absentee vote-by-mail systems. For example, a husband might force his wife to vote a certain way. The threat of coercion intensifies in a networked world, where people can "look over each other's shoulders" from thousands of miles away. This threat is serious enough that it is often considered a reason to not allow remote electronic voting.

Under threat models that do not include coercion, the notion of a universally verifiable election is fundamental. In the past, it has been considered important that a "computing device based" election scheme be universally verifiable in order to be considered deployable on a wide scale. During elections of this type, transcripts are published that include the final tally. Under reasonable assumptions about the safety of keys, and the intractability of some computational problems, these transcripts cannot be feasibly forged by any collection of malicious agents. Although it would be desirable to carry this property over to election schemes under the threat of coercion, this may be difficult. Election schemes under the threat of coercion lack certain very basic properties, which have generally been taken for granted in the election protocol literature, and hence may not be practical in a large-scale implementation.

DESCRIPTION

Figure 1:
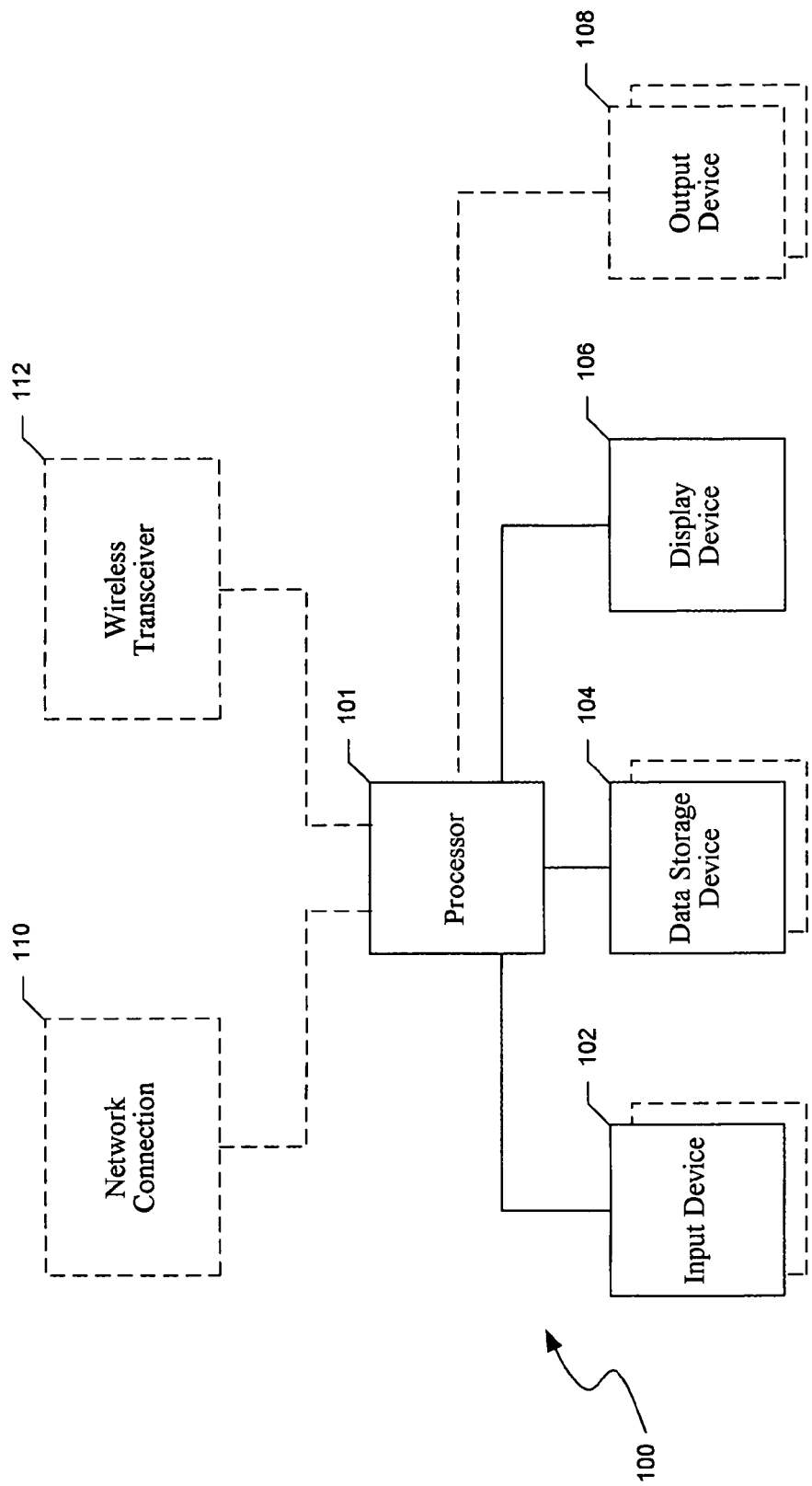
FIG. 1 is a block diagram showing a suitable environment for implementing the scheme.

The scheme described herein allows the voter to remain in exclusive possession of secret information that is used by a voter to cast a ballot. It allows a voter that has been pushed to reveal secret information to provide a false answer without being discovered. After providing the false answer, the voter can then proceed and cast a "real" vote on his or her own. This is achieved while still maintaining a collection of election audit properties that are characteristic of good electronic election protocols. An election scheme is coercion safe if, even in the coercion threat model, its transcript can not be feasibly forged by any collusion of authorities that, together, are unable to compute a tally. Further, in the case of a collusion that is able to compute a tally, the extent of the forgery is limited by the number of voters coerced.

At a summary level, the invention works as follows:

1. Voters participate in a secret "voter registration" process in prior to the start of the election. This process must make the voter safe from coercion by standard physical means. In practice, this means the voter must report to a county registration center, where physical privacy is guaranteed. However, the voter need only participate in this registration process once. Thereafter, the method of this invention will protect the voter against coercion through the course of multiple elections.
2. During the registration process, each voter selects a secret "confirmation code," or "confirmation pass phrase."
3. The "confirmation pass phrase" is encrypted by the voter and the encrypted form is publicly registered to that voter.
4. In order to cast a ballot, each voter must supply an accompanying (encrypted) pass phrase. The accompanying pass phrase does not have any effect on whether the ballot is "accepted" or not—so if the voter is being "supervised" by a coercer, the voter is still free to supply any pass phrase whether it matches the voter's registered pass phrase or not. The coercer will not be able to tell the difference. However, the accompanying pass phrase will have an effect on whether the ballot it accompanies is counted or not. The mechanism for this (described next) nevertheless assures that
   (a) Anyone, including the coercer, can inspect the ballot box contents and the tally to determine whether the tally is accurate or not (i.e. the election is Universally Verifiable).
   (b) In spite of the full availability of election data, the encryption and count mechanisms ensure that the coercer will still not be able to determine what vote, if any cast by the voter is actually included in the count.
5. The tabulation (counting) of encrypted votes is accomplished roughly by randomly mixing voted ballot—encrypted pass phrase pairs as well as the original registration data. After randomization, the appropriate data is decrypted by election authorities holding shares of the encryption key. Only when a match between a pass phrase in the randomized ballot data matches a pass phrase in the randomized registration data is the ballot counted. The matching is done without ever decrypting either of the pass phrases. Since all the randomization is done by way of a cryptographic verifiable shuffle, the results can still be inspected and verified by anyone for accuracy.

FIG. 1 and the following discussion provide a brief, general description of a suitable computing environment in which aspects of the invention can be implemented. Although not required, aspects and embodiments of the invention will be described in the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to FIG. 1, one embodiment of the invention employs a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet (not shown in FIG. 1). Aspects of the invention may also be practiced in a variety of other computing environments.

Figure 2:
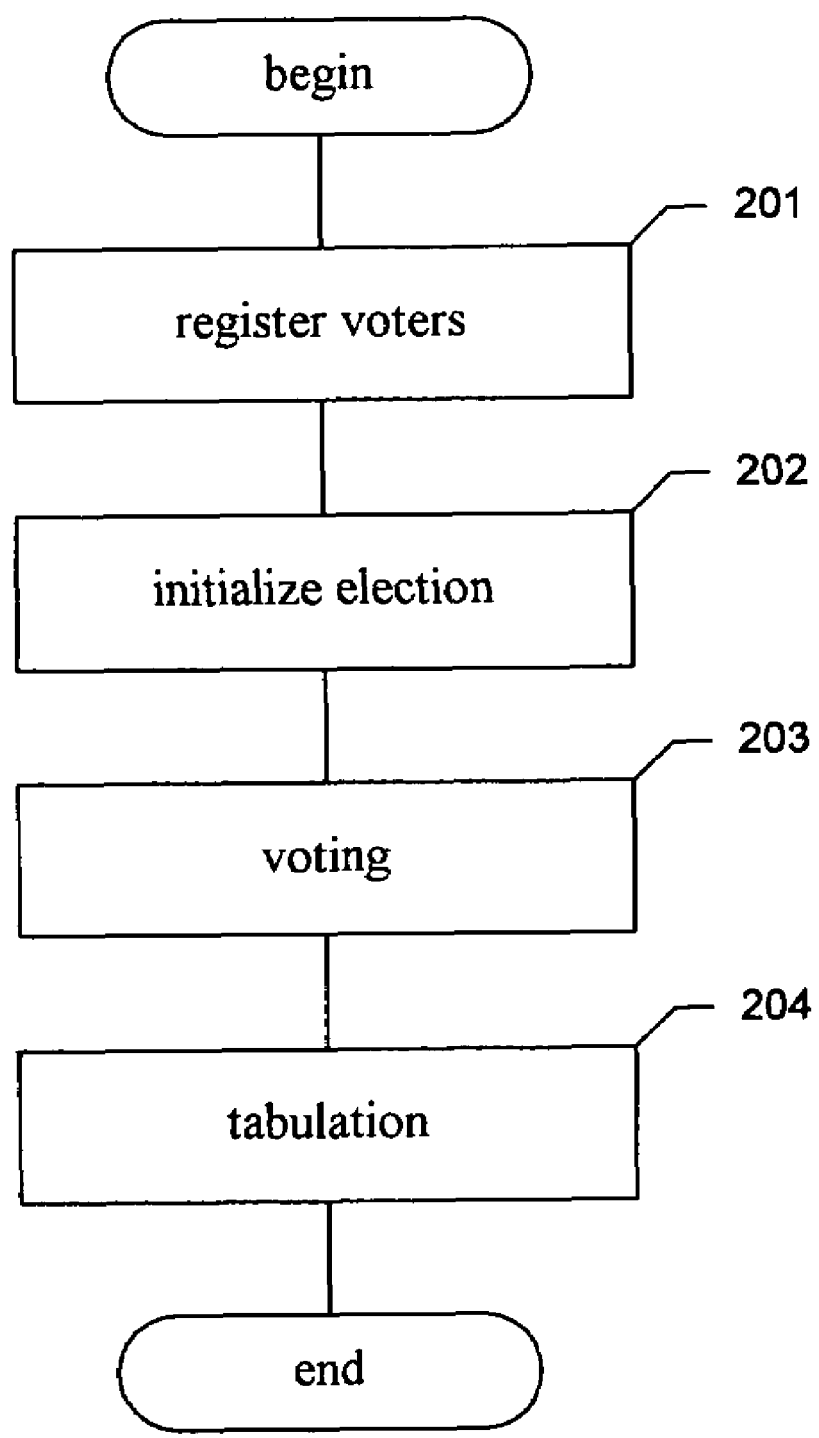
FIG. 2 is a flow diagram showing steps typically performed in accordance with the scheme.

FIG. 2 is a flow diagram showing steps typically performed in accordance with the scheme. These steps are described in more detail below. In step 201, voters are registered to add them to the list of registered voters eligible to cast votes, and to provide them with voting credentials. In step 202, the election is initialized to assign ballot choice values to candidates. In step 203, voters cast their votes by submitting encrypted ballots. In step 204, the votes cast in step 203 are tabulated, and added to the vote total only if the validity of the received ballot can be verified. After step 204, these steps conclude.

1 Coercion Implications of Partitionable Tabulation

The purpose of this section is to
1. Characterize a class of election schemes that includes the vast majority of schemes previously studied, and also seems likely to include all schemes that are "practical" for large scale, public elections.
2. Establish some bounds on what can be achieved by schemes in this class under the coercion threat model.

Definition 1 Henceforth, we call any participant in the election process, or any individual who exerts, or attempts to exert, an influence on the election process a player. Thus voters, election officials, and tabulators are all players, but so are all individuals who seek to influence the election outcome even though they may have no official role in it.

Definition 2 Player $P_1$ coerces player $P_2$ if $P_1$ obtains from $P_2$ any information that the election protocol does not require $P_2$ to reveal to $P_1$. Identical terminology is used when the coercer is actually a group of players. That is, no aspects of the invention limit its utility to the case were the coercer is a single individual. Therefore, henceforth, we will not endevor to make an explicit distinction between coercion by an individual and coercion by a group of individuals acting together.

Definition 3 Coercible information is all information whose authenticity can be "verified" by the coercer. If the authenticity can not be verified, then the voter (or individual being coerced) is free to lie about it to the coercer.

Definition 4 Recall that a tally is a function t: $C \rightarrow N = Z^+ \cup \{0\}$, where $\Gamma = \{c_1, \ldots, c_l\}$ is the "candidate slate". We write $$|t| = \sum_{i=1}^{l} t(c_i)$$

The invention requires something roughly like digital ballot box. At very least, this is a storage device connected to a network, or otherwise openly accessible to voters. A standard web server and database application provides an embodiment of such a device. In practice, more security measures would be built into, or around this device in order to protect against damage or destruction caused by either malicious or natural forces. The invention also requires that voters be able to translate their choices into a digital representation, and further encrypt that representation by the methods presented in the remainder of this invention. A generic PC provides an embodiment of such a device.

Definition 5 Since the transmission and storage of information are the key elements of this invention rather than the particular technologies that facilitate transmission and storage, we will adopt the more generic term bulletin board to denote the openly accessible storage device, and we denote the act of recording information on (or in) the bulletin board as posting. (In the voting context, this corresponds, intuitively, to the act of "casting a ballot".) Further, we denote the strings, or records of information that are posted to the bulletin board as posts. (In the voting context, these correspond, intuitively, to voted ballots.)

Let us now consider a set of very general properties that characterize a broad class of election protocols. The properties are considered in the absence of coercion. That is, in verifying a given property with respect to a particular protocol, we consider all potential protocol executions where the only information exchanged between players is that which is specified by the protocol. (We number these properties sequentially as PP-1, PP-2, etc.)

PP-1. Posts are always appended to the bulletin board, $\mathcal{BB}$, that is, deletions are not allowed. And posting is an atomic transaction, that is, at any given time, $\mathcal{BB}$ will contain exactly k posts, for some non-negative integer k.

PP-2. Any player may append a post regardless of the state (contents) of $\mathcal{BB}$.

PP-3. At any given time, a tally can be formed, and it is unique. That is, it is not possible (or at least "overwhelmingly improbable"), that $\mathcal{BB}$ is in some state, $C(\mathcal{BB})$ that is "invalid" for tabulation, and the tally, tally ($C(\mathcal{BB})$): $C \rightarrow N$ is well defined.

PP-4. A collection of players either can or cannot compute the tally independent of the state of $\mathcal{BB}$.

Recall that the voter role, $\mathcal{O}$, is essentially a public list of players (eligible voters), $\{v_1, \ldots, v_k\}$. Also, we use $C(\mathcal{BB})$ to denote the contents of $\mathcal{BB}$ at an arbitrary time, that is, the sequence of posts $p_1, \ldots, p_t$. Let $\mathcal{P}$ be the set of all players in the protocol, so $\mathcal{O} \subset \mathcal{P}$.

For simplicity of presentation, we assume that the ballot consists of one issue, that the candidate slate, $\Gamma$, is given by $\{c_1, \ldots, c_l\}$, and that each voter is allowed to choose (vote for) "at most one" candidate. Generalizing this setting to one that includes more general ballot types (that do not include "write-ins") is fairly straightforward.

Definition 6 Let $C=C(\mathcal{BB})$ be any state of $\mathcal{BB}$ (sequence of posts). If $\rho$ is a post, we denote by $C \oplus \rho$ the state of $\mathcal{BB}$ after appending the single post $\rho$. We also use the notation $t_C$ to denote the tally, tally (C).

Definition 7 A vote function (on $\mathcal{BB}$) is a map $$\chi: P \times C(\mathcal{P}) \rightarrow \{0,1\}^\Gamma \quad (1)$$

characterized by the following vf-1. For all $p \in \mathcal{P}$ $$|\chi(p, C(\mathcal{BB}))| \in \{\epsilon 0, 1\} \quad (2)$$

vf-2. For all $C(\mathcal{O})$, if $p \notin \mathcal{O}$, then (with "overwhelming probability")

$$\chi(p, C(\mathcal{BB})) = 0 \quad (3)$$

Intuitively, this says that the protocol "only allows members of the voter role (eligible voters) to vote".

vf-3. For all $p \in \mathcal{P}$, if p posts $\rho$, then the following holds (with "overwhelming probability") for all $q \in \mathcal{P}$, $$\chi(q, C(\mathcal{BB}) \oplus \rho) - \chi(q, C(\mathcal{BB})) = \begin{cases} t_{C(\mathcal{BB}) \oplus \rho} - t_{C(\mathcal{BB})} & \text{if } q = p \\ 0 & \text{if } q \neq p \end{cases} \quad (4)$$

Intuitively, this says that the protocol "only allows a voter to vote on his own behalf". It rules out schemes that allow multiple voters to combine their votes into one or more posts.

vf-4. For all $1 \leq i \leq l$, and all $1 \leq j \leq k$, if $|\chi(v_i, C(\mathcal{BB}))|=0$, then $v_i$ can compute (with probability 1) a post $\rho$ such that $$t_{C(\mathcal{BB}) \oplus \rho}(\pi) - t_{C(\mathcal{BB})}(\pi) = \begin{cases} 1 & \text{if } \pi = j \\ 0 & \text{if } \pi \neq j \end{cases} \quad (5)$$

Intuitively, this simply says that if $v_i$ has "not yet voted", then $v_i$ can append a "vote" for any candidate. However, the statement does not preclude the possibility that the protocol may allow $v_i$ to "cast a vote" and then later "change it". (Nevertheless, the majority of protocols in the literature, which essentially allow each voter "one and only one chance to vote", do satisfy this criteria.)

vf-5. For all $1 \leq i \leq l$, if $|\chi(v_i, C(\mathcal{BB}))|=1$, then $v_i$ can with at most negligible probability compute a post $\rho$ satisfying $$|t_{C(\mathcal{BB}) \oplus \rho}| > t_{C(\mathcal{BB})}| \quad (6)$$

Intuitively, this simply says that no voter may "vote more than once". Again, however, the statement does not preclude the possibility that the protocol may allow a voter to "change a vote" or to "retract a vote". (As before, the majority of protocols in the literature satisfy this criteria.)

Let $A_{ij}$ be the event that $v_i$ computes a post, $\rho$, satisfying $$t_{C(\mathcal{BB}) \oplus \rho}(c_j) - t_{C(\mathcal{BB})}(c_j) = -1 \quad (7)$$

Let $B_{ij}$ be the event that $\chi(v_i, C(\mathcal{BB}))(c_j)=1$.

vf-6. There is a constant, $\alpha$ ($0 \leq \alpha \leq 1$) such that, for all $1 \leq i \leq l$, and all $1 \leq j \leq k$, the conditional probability, $P(A_{ij}|B_{ij})$ satisfies $$P(A_{ij}|B_{ij}) = \alpha \quad (8)$$

independent of the values of i, j, and the state of the bulletin board, $C(\mathcal{BB})$. Intuitively, this says that if the protocol allows "a voter to change a vote at some time" then the protocol allows "any voter to change a vote at any time". However, it does not preclude the protocol from forbidding vote changes, which is more common in the literature.

vf-7. For all $1 \leq i \leq l$, and all $1 \leq j \neq \eta \leq k$, the conditional probability, $P(A_{ij}|B_{i\eta})$ satisfies $$P(A_{ij}|B_{i\eta}) \leq \epsilon \quad (9)$$

where $\epsilon \geq 0$ is negligible.

Intuitively, this says that the protocol only allows "a voter to reduce the count for a candidate" if "that voter has voted for that candidate". Again, this does not preclude the protocol from forbidding vote changes.

PP-5. The protocol admits a vote function. (Note that this does not require that the vote function be computable by any of the players, only that it exist.)

Definition 8 An election protocol is said to have partitionable tabulation if and only if it satisfies PP-1-PP-5. For brevity, we will also use the term partitionable election protocol to describe any election protocol has partitionable tabulation.

Theorem 1 If an election protocol has partitionable tabulation, and a coercer contains a collection of players capable of computing a tally, then for any $1 \leq i \leq l$, the value of $\chi(v_i, C(\mathcal{BB}))$ is coercible.

Proof: (Sketch) The coercer can step through the sequence of ballot box images, at each point computing the tally (see assumption PP-4) and requiring $v_i$ to "add a vote" of a particular value. By re-computing the tally with $v_i$'s post appended, the coercer can determine which posts were added by $v_i$ and their cumulative effect on the tally.

Note that this presumes a model in which "after the fact" coercion is allowed. That is, the coercer may interact with the voter after the bulletin board has been closed. However, this assumption can be eliminated with a reasonable assumption on the computing power of voters. In particular, we can show that the coercer is able, by way of a single coercion event, to 1. Impersonate the voter during the course of the election—thereby "adding any chosen vote to the bulletin board (ballot box)", and consequently forging "part" of the election transcript.
2. Detect any attempts by the voter to independently change the vote.

Definition 9 A partitionable election protocol is coercion resistant if, under the assumption that there is no coercer capable of independently computing a tally:

CS-1. If $p \in \mathcal{O}$ and $v_i \in \mathcal{P} v_i \neq p$, then p cannot compute $\chi(v_i, C(\mathcal{BB}))$ with probability higher than "random guess+ $\epsilon$".

CS-2. The election results are publicly verifiable.

Definition 10 A partitionable election protocol is coercion safe if, it is coercion resistant and, under all collusion scenarios, CS-3. If $t_I$ is the "ideal tally", then verification of the election guarantees $$|t_{C(\mathcal{BB})_j} - t_I| \leq M \tag{10}$$

2 A Coercion Safe Election Protocol

We assume the standard ElGamal cryptographic setting: p and q are large primes with $q|p-1$. A subgroup generator, $g \in Z_p^*$ with $|g|=q$, and $h=g^s$ with s shared by a (t, n) threshold scheme among n tabulation authorities, $A_1, \ldots, A_n$.

The protocol we next describe is coercion resistant. We will later describe how it can be easily augmented to give a coercion safe protocol. The advantage of describing the weaker version first is that most of the difficulty lies in its construction.

2.1 Registration

Recall that we assume voters are safe from coercion during their registration session. Care must still be taken to assure that information exchanged during registration is not coercible afterwards.

We denote the voter by $v_i$.

R-1. $v_i$ chooses a random $r_i \in \{g\}$, and a random $\alpha_i \in Z_q$, and forms $$(U_{i0}, W_{i0}) = (g^{\alpha_i}, h^{\alpha_i} r_i) \tag{11}$$

R-2. For each $1 \leq j \leq n$

R-2.1. $v_i$ obtains from $A_j$ the pair $(U_{ij}, W_{ij})$ given by $$(U_{ij}, W_{ij}) = (g^{\beta_{ij}}, h^{\beta_{ij}}) \tag{12}$$

where $\beta_{ij} \in \{g\}$ is chosen randomly by $A_j$.

R-2.2. $v_i$ and $A_j$ execute an interactive Chaum-Pedersen proof of validity for the relation $\log_g U_{ij} = \log_h W_{ij}$. That is, the challenge is generated randomly by $v_i$ rather than via a hash function (Fiat-Shamir heuristic). This allows $v_i$ to later produce simulated proofs in the face of coercion.

R-3. After checking each Chaum-Pedersen proof, $v_i$ computes $$(U_i, W_i) = \left(\prod_{\mu=0}^{n} U_{i\mu}, \prod_{\mu=0}^{n} W_{i\mu}\right) \tag{13}$$

R-4. For each $1 \leq j \leq n$, $v_i$ obtains a signature on $(U_i, W_i)$ from $A_j$ as a receipt.

R-5. $(U_i, W_i)$ is added to the voter roll, O. When the registration period ends, each authority should sign O.

Remark 1 As long as $v_i$ knows that one specific authority, $A_J$, is not a coercer, and fewer than t authorities (the number necessary to compute a tally) are colluding to coerce (though $v_i$ may not explicitly know their identities), the value of $r_i$ is not coercible. This is because $v_i$ can justify the validity of any $r_i$ and $\alpha_i$ by lying to the coercer about the value of $(U_{i,J}, V_{i,J})$ and presenting a forged (i.e. simulated) Chaum-Pedersen proof.

The requirement that $v_i$ knows a specific honest $A_J$ may be relaxed if we assume that it is acceptable for $v_i$ to be caught lying to the coercer. Alternatively, if n>>t, then $v_i$ can pick an J at random, $1 \leq J \leq n$, assume that $A_J$ is honest, and then know that the chance of being caught lying is at most $(t-1)/n$.

2.2 Election Initialization

EI-1. For each $1 \leq j \leq n$, and for each $1 \leq i \leq l = |O|$, authority $A_j$ generates randomly and independently a pair of elements in $\{g\}$, $(\epsilon_{ij}, \eta_{ij})$. The quantities $$(\xi_i, \eta_i) = \left(\prod_{j=1}^{n} \xi_{ij}, \prod_{j=1}^{n} \eta_{ij}\right) \tag{14}$$

are publicly computed. These are all published (and signed).

EI-2. The ballot choices $\gamma_\mu \in \{g\}$, $1 \leq \mu \leq k = |\Gamma|$, are assigned by some public random process, or by sharing. (The value $\gamma_\Xi$ will indicate a vote for candidate $c_\mu$.)

2.3 Voting

V-1. $v_i$ chooses random $v_{i1} \in Z_q$ and encrypts her vote as the ElGamal pair $$(A_i, B_i) = (g^{v_{i1}}, h^{v_{i1}} \gamma(i)) \tag{15}$$

V-2. $v_i$ then chooses random $v_{i2} \in Z_q$, computes $s_i = r_i/\gamma(i)$ and encrypts it as $$(C_i, D_i) = (g^{v_{i2}}, h^{v_{i2}} s_i) \tag{16}$$

V-3. $v_i$ then constructs non-interactive proofs of knowledge, $Q_i^{AB}$ and $Q_i^{CD}$, for the pairs $(A_i, B_i)$ and $(C_i, D_i)$ respectively. These proofs show that the pairs are of the required form, and that $v_i$ knows the values of $s_i$ and $\gamma(i)$.

V-4. $v_i$ submits the encrypted voted ballot $$E_i = ((A_i, B_i), (C_i, D_i), Q_i^{AB}, Q_i^{CD}) \qquad (17)$$

V-5. Though not necessary in the "append only" bulletin board model, in practice, $v_i$ would be issued a receipt for $E_i$.

2.4 Tabulation

In this section, we assume a subset of t authorities has been fixed. Without loss of generality, we may assume these are $A_1, \ldots, A_t$.

T-1. For each $1 \leq i \leq l$, the quantities $$(\overline{U}_i, \overline{W}_i) = (\xi_i U_i, \eta_i W_i) \qquad (18)$$

are publicly computed.

T-2. The authorities execute a verifiable shuffle of the sequence of pairs of ElGamal pairs, $(\overline{U}_i, \overline{W}_i)$, $(\xi_i, \eta_i)$, resulting in output set of pairs of ElGamal pairs $$\{(\Phi_i, \Psi_i), (\overline{\xi}_i, \overline{\eta}_i)\}_{i=1}^{l} \qquad (19)$$

where $\Phi_i, \Psi_i, \overline{\xi}_i, \overline{\eta}_i \in \langle g \rangle$. The properties of this mix are that the set of decrypted value pairs, $(a_i, b_i)$, of the output sequence are exactly the same as the set of decrypted value pairs of the input sequence, but in randomly permuted order. Executing such a verifiable shuffle is discussed in greater detail in U.S. patent application Ser. No. 09/816,869, entitled "VERIFIABLE, SECRET SHUFFLES OF ENCRYPTED DATA, SUCH AS ELGAMAL ENCRYPTED DATA FOR SECURE MULTI-AUTHORITY ELECTIONS," filed Mar. 24, 2001, and PCT Application No. WO02/77929, entitled "VERIFIABLE SECRET SHUFFLES AND THEIR APPLICATION TO ELECTRONIC VOTING," filed Mar. 25, 2002, each of which is hereby incorporated by reference in its entirety.

T-3. Let $\{((A_m, B_m), (C_m, D_m))\}_{m=1}^{M}$ be the set resulting from all voted ballots with verified validity proofs. The authorities execute another verifiable shuffle of the sequence of these M ElGamal pair pairs, with resulting output set $$\{((\overline{A}_m, \overline{B}_m), (\overline{C}_m, \overline{D}_m))\}_{m=1}^{M} \qquad (20)$$

T-4. For each $1 \leq m \leq M$, the l ElGamal pairs $$(\Theta_{mi}, \Omega_{mi}) = (\overline{A}_m \overline{C}_m \overline{\xi}_i \Phi_i^{-1}, \overline{B}_m \overline{D}_m \overline{\eta}_i \Psi_i^{-1}) \qquad (21)$$

$1 \leq i \leq l$ are publicly computed.

T-5. The authorities jointly decrypt all of the pairs $(\overline{A}_m, \overline{B}_m)$, and $((\Theta_{mi}, \Omega_{mi})$, $1 \leq i \leq l$, $1 \leq m \leq M$. Let these be, respectively, $a_m$, and $x_{mi}$.

T-6. For each $1 \leq m \leq M$, $a_m$ is added to the tally if and only if

T-6.1. $a_m \in \{\mu_1, \ldots, \mu_k\}$

T-6.2. For some $1 \leq i \leq l$, $x_{mi} = 1$.

2.5 Tabulation—Alternate Embodiment

In this section, we assume a subset of t authorities has been fixed. Without loss of generality, we may assume these are $A_1, \ldots, A_t$.

T2-1. For each $1 \leq i \leq l$, the quantities $$(\overline{U}_i, \overline{W}_i) = (\xi_i U_i, \eta_i W_i) \qquad (22)$$

are publicly computed.

T2-2. The authorities execute a verifiable shuffle of the sequence of ElGamal pairs, $(\overline{U}_i, \overline{W}_i)$, resulting in output set of ElGamal pairs $$\{(\Phi_i, \Psi_i)\}_{i=1}^{l} \qquad (23)$$

where $\Phi_i, \Psi_i \in \langle g \rangle$. The properties of this mix are that the set of decrypted values of the output sequence are exactly the same as the set of decrypted values of the input sequence, but in randomly permuted order.

T2-3 For each voted ballot, $E_m$, $1 \leq m \leq M$, with verified validity proofs, the l ElGamal pairs $$(\Theta_{mi}, \Omega_{mi}) = (A_m C_m \Phi_i, B_m D_m \Psi_i) \qquad (24)$$

are publicly computed.

T2-4. The authorities execute a verifiable shuffle of the sequence of M×l ElGamal pair pairs, $((A_m, B_m), (\Theta_{mi}, \Omega_{mi}))$, resulting in the output set $$\{((\overline{A}_m, \overline{B}_m), (\overline{\Theta}_{mi}, \overline{\Omega}_{mi}))\}_{m=1, i=1}^{m=M, i=l} \qquad (25)$$

T2-5. The authorities jointly decrypt all of the pairs $(\Phi_i, \Psi_i)$, $(\overline{A}_m, \overline{B}_m)$, and $(\overline{\Theta}_{mi}, \overline{\Omega}_{mi})$ Let these be, respectively, $\phi_i$, $a_m$, and $x_{mi}$.

T2-6. For each $1 \leq m \leq M$, $a_m$ is added to the tally if and only if

T2-7. $a_m \in \{\mu_1, \ldots, \mu_k\}$

T2-8. For some $1 \leq i \leq l$ and $1 \leq j \leq l$, $x_{mi} = \phi_j$.

2.6 Making the Protocol Coercion Safe

The protocol, as presented is clearly not coercion safe. If t or more authorities collude, they can decrypt the original voter secrets, $r_i$, and this allows them to impersonate all the voters. The problem can be fixed by adding an anonymous signature requirement to the ballot casting operation. (See aforementioned patent applications for a detailed description of an anonymous signature protocol that is "authority free".) In this case, even if a malicious agent has access to a secret, $r_i$, it can not affect the tally without the corresponding private signing key, which can not be obtained without coercion. The reason for this should be clear. An authority free, anonymous signature on the voted ballot prevents the authorities (even in collusion) from linking the original encrypted ballot (input to the verifiable shuffle, or mix) to an individual the way they can with a standard digital signature. A standard digital signature explicitly links signed data to a registered individual. An anonymous signature only links signed data to a member of a set, or group, of individuals.

I claim:

1. A method for conducting a coercion-resistant electronic election performed in a computing system, comprising:
   in the computing system, receiving from the voter a first voter confirmation value;
   in the computing system, after receiving the first voter confirmation value, receiving from the voter an encrypted ballot associated with the identity of the user and a second voter confirmation value associated with the identity of the user, the second voter confirmation value being formed based upon input from the voter, enabling the voter to determine whether the ballot will be counted by varying the input;
   in the computing system, without regard for the value of the received second voter confirmation value, adding the received ballot to a publicly-available list of cast ballots, such that members of the public are able to verify the addition of the received ballot to the list without being able to determine whether the ballot will be counted;
   dissociating the identity of the voter from the encrypted ballot and second voter confirmation value;
   after the dissociating, determining whether the second voter confirmation value received with the ballot matches the received first voter confirmation value; and in the computing system, counting the ballot if and only if the second voter confirmation value received with the ballot matches the received first voter confirmation value.

2. The method of claim 1 wherein the encrypted ballot and the second voter confirmation value are received together from the voter.

3. The method of claim 1, further comprising determining that the first and second voter confirmation values match if they are cryptographically related in a manner specified at a time before the first voter confirmation value is received from the voter.

4. A computer-readable medium whose contents cause a computing system to conduct a coercion-resistant electronic election by:

receiving from the voter a first voter confirmation value;

after receiving the first voter confirmation value, receiving from the voter an encrypted ballot associated with the identity of the user and a second voter confirmation value associated with the identity of the user, the second voter confirmation value being formed based upon input from the voter, enabling the voter to determine whether the ballot will be counted by varying the input;

adding the received ballot to a publicly-available list of cast ballots, such that members of the public are able to verify the addition of the received ballot to the list without being able to determine whether the ballot will be counted;

dissociating the identity of the voter from the encrypted ballot and second voter confirmation value;

after the dissociating, determining whether the second voter confirmation value received with the ballot matches the received first voter confirmation value; and counting the ballot if and only if the second voter confirmation value received with the ballot matches the received first voter confirmation value.

5. The computer-readable medium of claim 4 wherein the encrypted ballot and the second voter confirmation value are received together from the voter.

6. The computer-readable medium of claim 4 wherein the contents of the computer-readable medium further cause the computing system to determine that the first and second voter confirmation values match if they are cryptographically related in a manner specified at a time before the first voter confirmation value is received from the voter.

* * * * *